(12) United States Patent
Mozzami et al.

(10) Patent No.: US 11,544,661 B2
(45) Date of Patent: Jan. 3, 2023

(54) ESTIMATING SHIPPING COSTS WITH MACHINE LEARNING

(71) Applicant: Mercari, Inc., Palo Alto, CA (US)

(72) Inventors: Mohammad-Mahdi Mozzami, Palo Alto, CA (US); Lawrie Crate, Palo Alto, CA (US); Masanori Uehara, Palo Alto, CA (US); Eric Turner, Palo Alto, CA (US); Robin Clark, Palo Alto, CA (US); Yu Ishikawa, Palo Alto, CA (US); Chiaki Osaka, Palo Alto, CA (US)

(73) Assignee: Mercari, Inc., Palo Alto, CA (US)

( * ) Notice: Subject to any disclaimer, the term of this patent is extended or adjusted under 35 U.S.C. 154(b) by 276 days.

(21) Appl. No.: 16/878,020

(22) Filed: May 19, 2020

(65) Prior Publication Data

US 2021/0319399 A1    Oct. 14, 2021

Related U.S. Application Data

(60) Provisional application No. 63/007,390, filed on Apr. 9, 2020.

(51) Int. Cl.
| | |
|---|---|
| *G06Q 10/08* | (2012.01) |
| *G06N 3/08* | (2006.01) |
| *G06N 3/04* | (2006.01) |
| *G06F 16/9537* | (2019.01) |
| *G06F 9/54* | (2006.01) |

(52) U.S. Cl.
CPC ....... *G06Q 10/08345* (2013.01); *G06F 9/547* (2013.01); *G06F 16/9537* (2019.01); *G06N 3/04* (2013.01); *G06N 3/08* (2013.01); *G06Q 10/0835* (2013.01); *G06Q 10/0838* (2013.01)

(58) Field of Classification Search
CPC .......... G06Q 10/08345; G06F 16/9537; G06F 9/547; G06N 3/04
See application file for complete search history.

(56) References Cited

U.S. PATENT DOCUMENTS

| | | | |
|---|---|---|---|
| 2018/0225553 A1* | 8/2018 | Ha | G06N 3/0445 |
| 2020/0110809 A1* | 4/2020 | DeFelice | G06N 3/0472 |

FOREIGN PATENT DOCUMENTS

| | | | | |
|---|---|---|---|---|
| EP | 3628851 | * | 4/2020 | G06N 3/02 |
| WO | WO2016039724 | * | 3/2016 | G06Q 10/08 |

* cited by examiner

*Primary Examiner* — Myron Wyche
(74) *Attorney, Agent, or Firm* — Sterne, Kessler, Goldstein & Fox P.L.L.C.

(57) ABSTRACT

Disclosed herein are system, method, and computer program product embodiments for estimating shipping costs of items purchased in an online market using machine learning techniques. By determining in real-time the dimensional weight of an item with reference to a machine learning model describing past transactions, a buyer and seller in the online market can finalize the transaction in real-time. The machine learning model further implements a bias within the machine learning algorithm towards heavier estimation to avoid undercharging the market participants for shipping costs. One embodiment involves using these cost-estimation techniques in the context of a local shipping feature, which allows buyers and sellers to schedule a same-day delivery by seamlessly involving a local carrier.

19 Claims, 7 Drawing Sheets

ESTIMATING SHIPPING COSTS WITH MACHINE LEARNING

CROSS REFERENCE TO RELATED APPLICATIONS

This application claims the benefit of U.S. provisional patent application No. 63/007,390, entitled "ESTIMATING SHIPPING COSTS WITH MACHINE LEARNING," which was filed on Apr. 9, 2020, and which is hereby incorporated by reference in its entirety.

BACKGROUND

Online markets offer users the ability to buy and sell products, goods, and other commodities. In such markets, sellers are typically responsible for shipping purchased items to buyers, and doing so may present logistical challenges. For example, the seller may face difficulties in physically packing a purchased item. In some cases, where the buyer and seller are located close to each other, they may arrange for the seller to deliver the purchased item to the buyer. However, existing approaches are not optimal, as they place the burden of shipping on the buyers and sellers.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
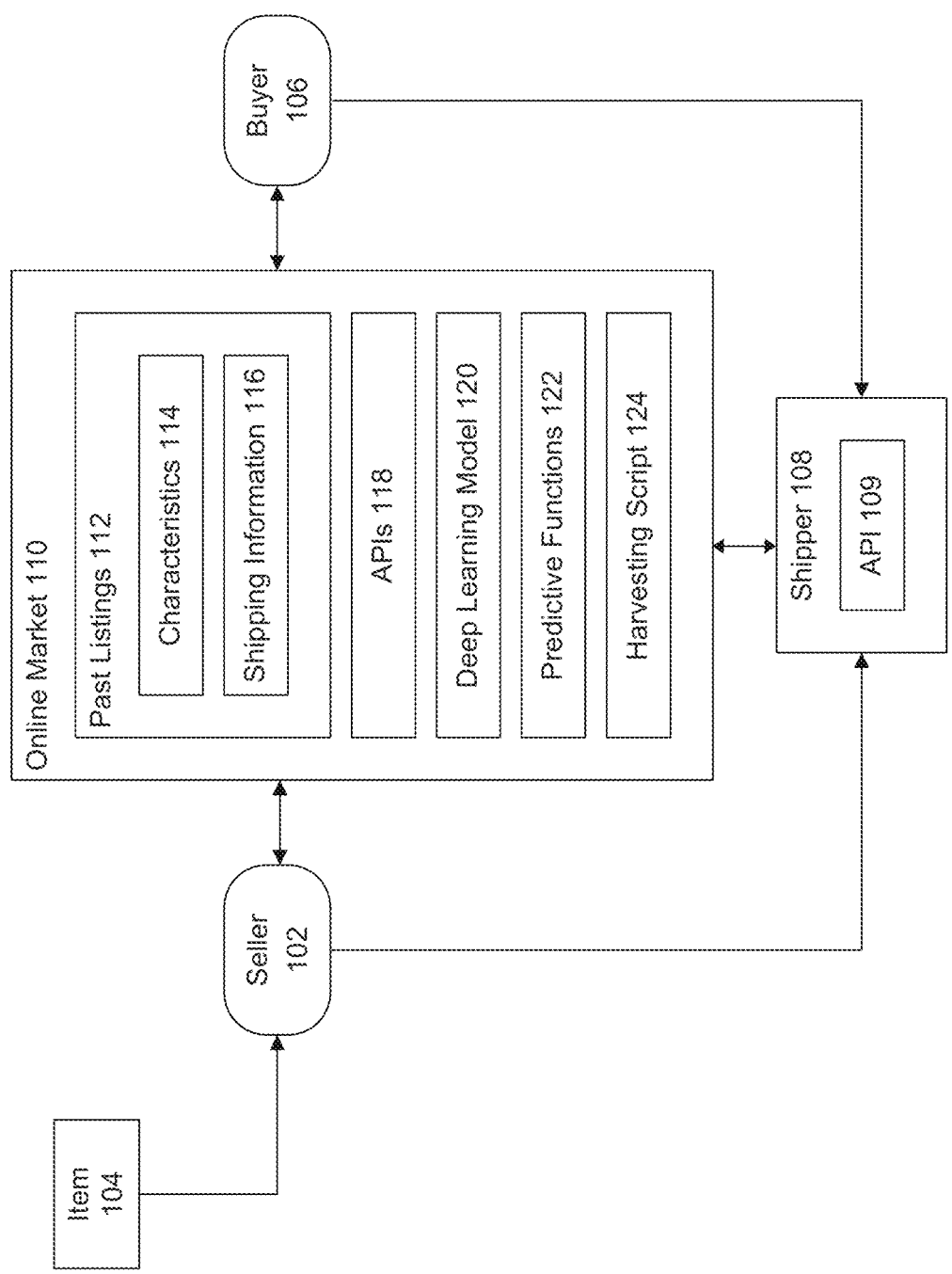
FIG. 1 is a block diagram of a computing environment, according to some embodiments.

Provided herein are system, apparatus, device, method and/or computer program product embodiments, and/or combinations and sub-combinations thereof, for estimating shipping costs of items purchased in an online market (such as but not limited to a consumer-to-consumer (C2C) marketplace) using machine learning techniques.

An online market may be a community-driven marketplace offering users the ability to buy and sell items through a mobile application, website, or other suitable software program. Such items may include telecommunication devices, computers, electronics, clothing and fashion accessories, artwork, instruments, sporting goods, and other goods, products, and commodities. Sellers in an online marketplace may list items for sale, include pricing information, attach a photograph, list the make/model, and specify other details. A buyer may browse items in the online market, view associated details, select an item for purchase, render payment for the item, and, eventually, have the item delivered to a specified location.

Items may be associated with various qualities, descriptors, fields, narratives, etc., which will be referred to in the herein disclosure as characteristics. For example, a used cellphone may be sold in an online market, and the market may know characteristics about the cellphone such as price, serial number, brand, sub-brand, color, model, hard-disk space, etc., e.g., APPLE, IPHONE X, red, 64-GB. For another example, a purse may be listed on the site and have characteristics such as GUCCI, shoulder bag, black, 2017, etc. Taken together, an item's characteristics may identify and describe the item. Similar items may share a large number of characteristics while vastly different items may have few shared characteristics. For example, the red, 64-GB IPHONE described above will have more characteristics in common with a black, 32-GB IPHONE than with the GUCCI shoulder bag.

In some embodiments, when a buyer and seller transact to complete a purchase, an online market may arrange shipping of the item through an appropriate carrier. Such a carrier may be a national carrier, e.g., UPS, FEDEX, DHL, etc. In one embodiment, referred to below as "Local Shipping," a carrier may be a local carrier that employs regionally-based couriers to make deliveries in the local area, e.g., POSTMATES, AMAZON, etc. Carriers, both local and national, may offer application programming interfaces (APIs) that allow the online market to gather information about the carrier's rates, arrange actual shipments, track shipments, and programmatically perform other shipping-related functions. The online market may also render payment to carriers, eliminating any need for the buyers and sellers to transact independently with the carrier. In some embodiments, the buyer and/or seller may select or designate a preferred carrier. In other embodiments, the online market may select a carrier based on appropriate considerations, e.g., seeking to find the lowest price among carriers.

An item's dimensional weight drives the item's shipping cost. Dimensional weight may be either: (1) the weight of the item; or (2) a mathematically derived indicator of an item's dimension or volume, e.g., the width multiplied by height multiplied by depth, spherical volume, or another indication of volume, which may be further adjusted using an appropriate multiplier or cost factor. A carrier may then use the larger number of the two-approaches above to determine the dimensional weight. For example, if a carrier transports a bowling ball weighing 16 pounds, the dimensional weight may be 16 pounds because the ball is more heavy than voluminous. However, if a carrier transports a box of feathers, the dimensional weight may reflect the volume of the box instead of the weight because the box is more voluminous than heavy.

Carriers may charge a fee for shipping based on an item's dimensional weight, setting price ranges based on the dimensional weights as specified in dimensional-weight price charts. For example, an object with a dimensional weight between 1 and 2 may cost a certain amount to ship, while an item with a dimensional weight between 2 to 3 may cost a higher amount. Different carriers may have different dimensional-weight price charts. Such a price chart is described in further detail below with reference to FIG. 2.

When a buyer and a seller finalize a transaction, the online marketplace may not know an exact dimensional weight of the purchased item. For example, the seller may not be able to (or not want to) ascertain an exact dimensional weight of the item. This presents a problem in an online market, where the cost needs to be provided to the buyer and/or seller for approval prior to finalizing the transaction.

Legacy systems fail to solve this problem and do not accurately and efficiently estimate the cost of an item purchased in an online marketplace. Accordingly, a need exists to estimate the dimensional weight of an item and to estimate the associated shipping cost to allow a buyer and seller to finalize a transaction in an online market. The embodiments described below accomplish this using machine learning technology. One embodiment employs a machine learning model containing past transactions and ground truths about actual shipping costs.

By estimating the cost of the shipping prior to completing the transaction, the online market allows a seller and buyer to confirm and acquiesce to the cost of shipping at the point the transaction is finalized. Accuracy is a driving and important consideration in such an estimation. If the estimated shipping cost is less than the resultant and actual shipping cost, then the online market may be forced to pay the difference, resulting in lost profits for the online market. Thus, the approach described herein provides a further technical benefit by implementing a bias within the machine learning algorithm towards heavier estimates. By making use of a suitable using cost function, the system also intelligently avoids the more severe penalties for wrong estimations at heavier dimensional weights (as it is more costly to be wrong for heavier/more voluminous items than for lighter packages).

Legacy systems also fail to provide a Local Shipping feature that allows buyers and sellers to transact while seamlessly integrating a local carrier to perform the delivery. Accordingly, a further need exists to provide a Local Shipping feature to buyers and sellers that uses cost-estimation functionality in the course of programmatically creating shipping orders with local carriers. Certain criteria may need to be met for Local Shipping to be available, e.g., the buyer and seller may need to be geographically proximate. However, by using a Local Shipping option, a buyer may receive a purchase made in an online market quickly, oftentimes in the same day.

FIG. 1 is a block diagram of computing environment 100, according to some embodiments. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Computing environment 100 may include seller 102, item 104, buyer 106, carrier 108, and online market 110.

Seller 102 may be an individual (i.e., a human being), group of such individuals, a computer program, artificial intelligence, or other suitable construct that interacts with an online market, such as online market 110 described below, to sell an item. Seller 102 may list items for sale, include pricing information, attach a photograph of the item, list the make/model of the item, specify other relevant details, and perform a variety of other functions in the online market.

Item 104 be a good, product, or commodity that is sold in an online marketplace, e.g., telecommunication devices, computers, electronics, clothing and fashion accessories, artwork, instruments, sporting goods, etc. One skilled in the relevant art(s) will appreciate that the variety of items sold by seller 102 in an online marketplace may be expansive.

Buyer 106 may be an individual (i.e., a human being), group of such individuals, a computer program, artificial intelligence, or other suitable construct that interacts with an online market to purchase an item that is offered for sale. Buyer 106 may browse items in the online market, view the associated details, select an item for purchase, render payment for the item, and perform other functions in the online market. While seller 102 and buyer 106 are described here as distinct individuals, one skilled in the art(s) will appreciate that particular individuals may both sell and buy items in the online marketplace. However, in the context of a single transaction, a distinct buyer and a distinct seller will exist.

Carrier 108 may physically complete deliveries from seller 102 to buyer 106. Carrier 108 may charge a fee for shipping the item that is based on a dimensional weight. Carrier 108 may specify price ranges in dimensional-weight price charts. Carrier 108 may be a national carrier, e.g., UPS, FEDEX, DHL, etc. Carrier 108 may be a local carrier that employs regionally-based couriers to make deliveries in the local area, e.g., POSTMATES, AMAZON, etc. Carrier 108 may also be a ride sharing app such as UBER, LYFT, etc.

API 109 may be provided by carrier 108 to allow online market 110 and other parties to gather information about shipping through the carrier (e.g., prices), arrange actual shipments, track shipments, and perform other shipping-related functions. API 109 may also allow carrier 108 to receive payment for completing the shipment. API 109 may provide a means of accessing a dimensional-weight price chart. For example, API 109 may receive a dimensional weight as input in a web request and provide the cost of shipping associated with that dimensional weight as an appropriately formatted web response.

Online market 110 may enable seller 102 to list and sell new or used items for sale, such as item 104, to potential buyers, such as buyer 106. Examples of online market 110 include MERCARI.COM, AMAZON.COM, EBAY.COM, CRAIGSLIST.COM, POSHMARK.COM, etc., to name just a few examples. Online market 110 may provide users access to the online marketplace using web servers, HTTP, or other appropriate web technologies. Online market 110 may impose access restrictions in the form of security requirements, e.g., by requiring a login and password to limit the access to the online marketplace and tailor the experience towards specific users. Online market 110 may track and store information about buyers and sellers, e.g., account information, demographics, credit card information, past purchases/sales, etc. To achieve the features described in this disclosure, online market 110 may include past listings 112, characteristics 114, shipping information 116, APIs 118, deep learning model 120, predictive functions 122, and harvesting script 124. Online market 110 may include a variety of additional modules, functions, and capabilities.

Past listings 112 may include information about items sold previously in online market 110. Past listings 112 may include characteristics 114 and shipping information 116. In one embodiment, past listings 112 may be supplemented by gathering additional items, characteristics, and shipping weights to better accurately estimate shipping costs across a greater variety of items. Such augmentation is described in further detail below with reference to FIG. 7.

Characteristics 114 may be information known or ascertained about item 104, such as price, serial number, brand, sub-brand, color, model, hard-disk space, etc. For example, characteristics 114 for a cellphone may be APPLE, IPHONE X, red, 64-GB while a purse may have characteristics 114 of GUCCI, shoulder bag, black, 2017, etc. Characteristics 114 may be vectorized and stored in past listings 112 as a means for comparison when determining estimates about dimensional weights, as described in further detail below with reference to FIGS. 5 and 6.

Shipping information 116 may represent the actual shipping costs that were incurred for an item shipped in past listings 112. These actual shipping costs may be referred to in the below disclosure as the ground truth, i.e., the observable, real-world costs of shipping the items that may be used to check the results of the machine learning approaches described herein. The comparison of the actual shipping costs and the estimated shipping costs may be represented in a confusion matrix or other suitable construct to determine the accuracy and efficacy of the machine learning methods employed herein.

APIs 118 may enable other entities (e.g., seller 102, buyer 106, and carrier 108) to programmatically access data and perform various functions available within online market 110. For example, APIs 118 may allow carrier 108 to interact with online market 110 in a Local Shipping feature to programmatically receive payment for deliveries, schedule deliveries, etc. APIs 118 may receive a suitably formatted web request and supply an appropriately formatted web response in response.

Deep learning model 120 may use representational learning to determine characteristics associated with items sold in online market 110. For example, deep learning model 120 may employ an item similarity model to derive characteristics 114 associated with item 104. Deep learning model 120 may extract an item embedding to create a vector, e.g. a 128-bit vector of floating point decimal numbers or other suitable mathematic representation of the item. Such a vector may serve as a representation of the characteristics associated with item 104 in multi-dimensional spaces and allow online market 110 to determine proximate, neighboring vectors stored within past listings 112.

Predictive functions 122 may include artificial intelligence and machine learning modules, approaches, and functions that estimate shipping costs for items purchased in an online market. Predictive functions 122 may operate with reference to actual shipping costs (ground truths) and stored vectors (characteristics associated with previously sold items) in past listings 112. In an embodiment, predictive functions 122 may receive as input a vector calculated by deep learning model 120 representing a particular item being purchased. Predictive functions 122 may then calculate a number, K, of proximate vectors from among the stored information in past listings 112, where K is a configurable number of vectors. From the K-number of proximate vectors, predictive functions 122 may calculate a weighted average of the actual shipping costs associated with the determined proximate vectors. This weighted average may represent the estimated dimensional weight, which may then be used to determine an estimated cost of shipping for designated carrier, such as carrier 108. This behavior is described in further detail below with reference to FIG. 5.

Harvesting script 124 may further populate past listings 112 with information gathered from other locations, e.g., online markets, web pages, and other digital sources. Harvesting script 124 may scrape data about items at these other locations, determine ground truths associated with the items, and build characteristic vectors from the scraped information. Harvesting script 124 is described in further detail below with reference to FIG. 7.

Figure 2:
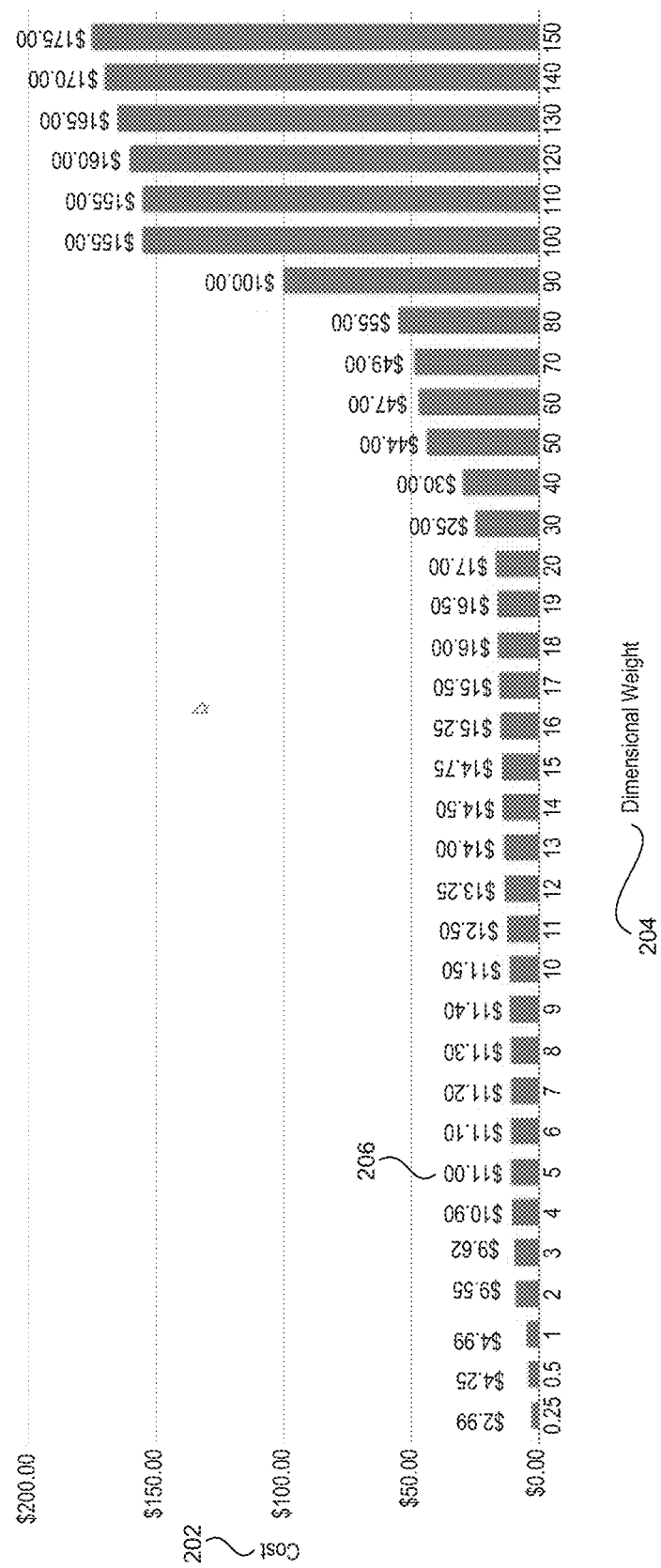
FIG. 2 is an example graph of shipping costs by dimensional weight, according to some embodiments.

FIG. 2 is an example graph of shipping costs by dimensional weight, according to some embodiments. The data provided in FIG. 2 is merely exemplary, and one skilled in the relevant art(s) will appreciate that many such graphs may exist and take different forms in accordance with this disclosure. FIG. 2 illustrates a dimensional-weight price chart representing shipping costs for an exemplary carrier. X-axis 204 represents dimensional weights for shipped items, where the dimensional weight may be the weight of the object in pounds or a cost-adjusted representation of an items volume, whichever is larger. Y-axis 202 represents the cost charged by exemplary carrier 108 for a shipped item. Costs 206 presents the cost of shipping an item, i.e., y-axis 202, across x-axis 204.

FIG. 2 evidences that higher costs may be associated with heavier/larger items and the relatively higher cost in making an error in estimation for heavier items. For example, if predictive functions 122 estimate that an object has a dimensional weight of 0.5 but the object has an actual weight of 1, the cost of the error is $0.74 ($4.99-$4.24). However, if an error is made between an object has a dimensional weight of 90 but the object has an actual weight of 100, the cost of the error is $55.00 ($155.00-$100.00). Accordingly, the estimation techniques described in further detail below aim to promote increased accuracy at the higher weight levels.

Figure 3:
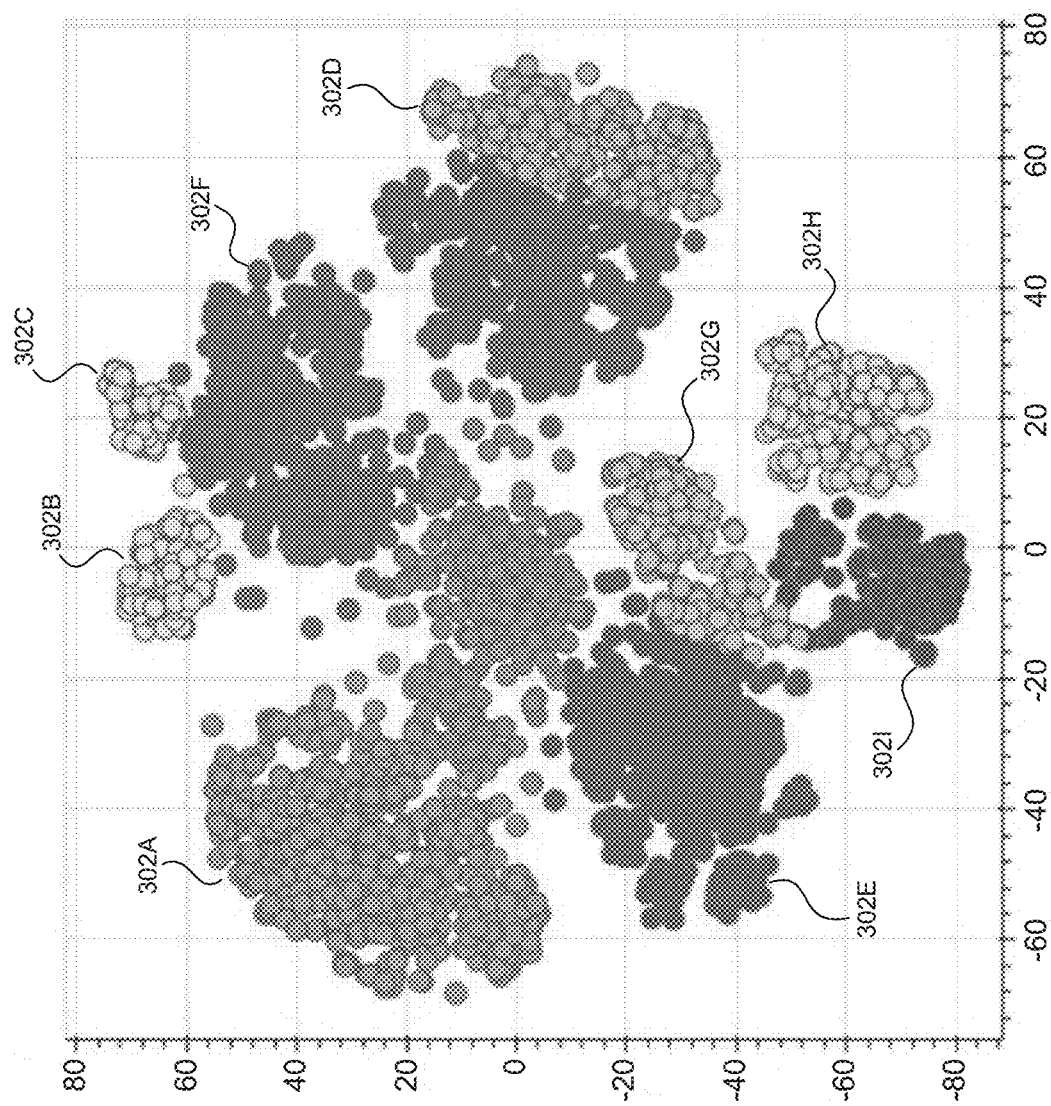
FIG. 3 is an example graph of characteristic data for shipped items reduced to two-dimensional space, according to some embodiments.

FIG. 3 is an example graph of characteristic data for shipped items reduced to two-dimensional space, according to some embodiments. FIG. 3 illustrates the clustering of previously sold items, i.e., clusters 302 such as cluster 302A, cluster 302B, etc. Clusters 302 arise when deep learning model 120 creates vectors based on characteristics for items sold in online market 110. Characteristics 114 may represent past sales and may be vectorized to mathematical/geometric representations. For example, an item's characteristics may be represented using a 128-bit vector of floating point decimal numbers. Because it is impossible for human brains to visualize 128-dimensional spaces, FIG. 3 represents stored 128-bit vectors within two-dimensional space by reducing the 128-dimension vectors to a two-dimensional plot.

FIG. 3 indicates the clustering behavior of items sold in an online market. For example, cluster 302A may represent a variety of IPHONES sold in online market 110, cluster 302B may represent ANDROID phones sold in online market, while cluster 3021 may represent clothing. Similar items, when vectorized in the foregoing fashion, will thus be located spatially closer together. The data provided in FIG. 3 is merely exemplary, and one skilled in the relevant art(s) will appreciate that an infinite number of such graphs and data configurations may exist and take different forms while remaining in accordance with this disclosure.

Figure 4:
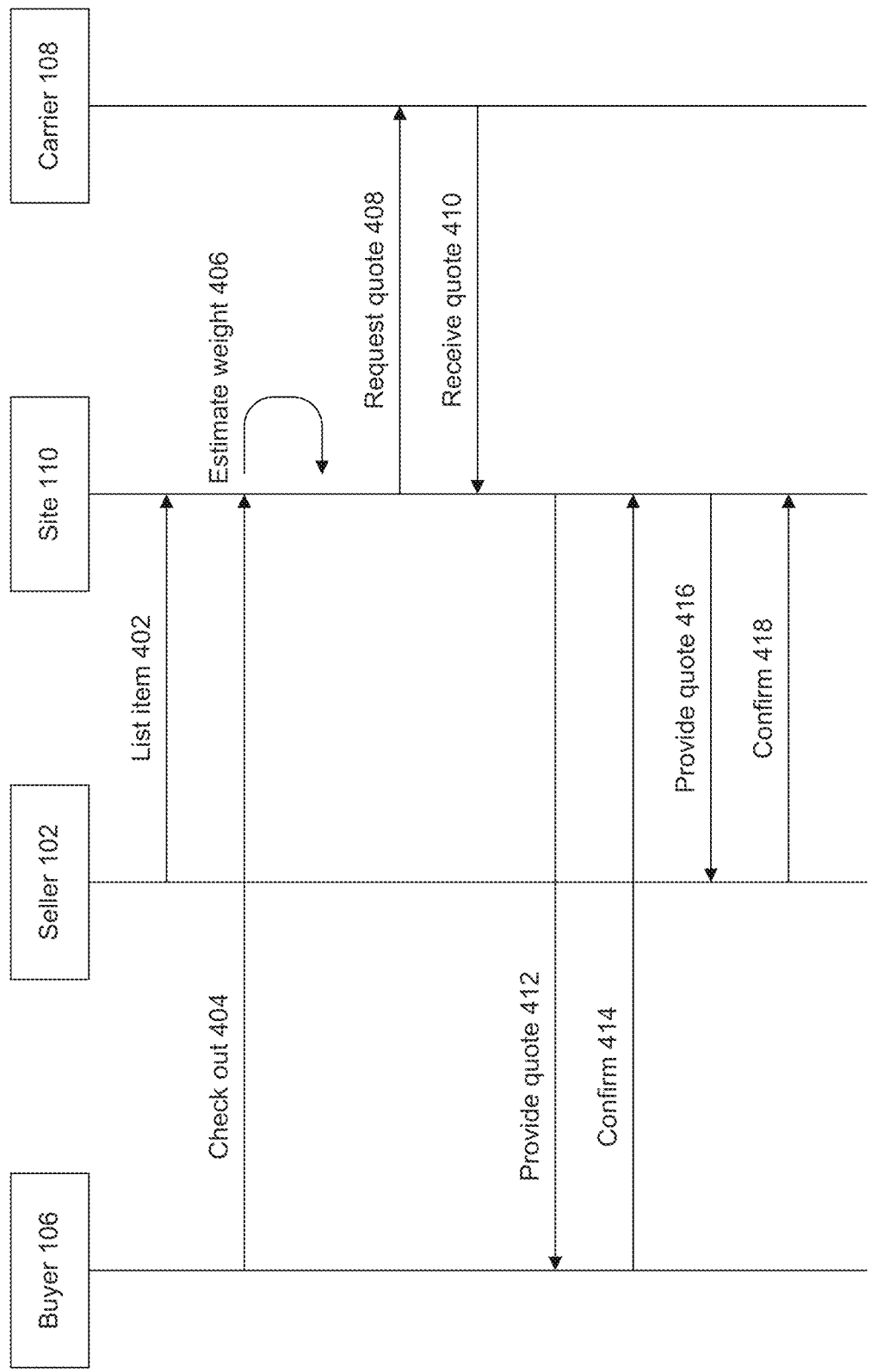
FIG. 4 is a flowchart illustrating a method of scheduling shipment of an item purchased in an online market with a carrier, according to some embodiments.

FIG. 4 is a flowchart illustrating method 400 of scheduling shipment of an item purchased in an online market with a carrier, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, online market 110 may receive the listing of item 104 for sale from seller 102. Seller 102 may suggest a price, attach a photograph of the item, and specify other details about item 104. In one embodiment, seller 102 may specify or designate a particular carrier or choose a particular carrier from available carriers. In an embodiment, seller 102 may specify a pickup time and location or provide this information in a later step in another embodiment. Online market 110 may provide seller 102 with other options, e.g., the ability to specify that the sale is "Local Only," meaning that online market 110 should use the Local Shipping feature to complete the transaction, i.e., only allow local buyers to purchase the item. In an example that will be referred to in further detail below, seller 102 may list for sale a red, 32-GB IPHONE 7.

In 404, buyer 106 may purchase item 104 on online market 110 and proceed to check out. For example, buyer 106 may browse listings in online market 110 and decide to purchase the red, 32-GB IPHONE 7 listed by seller 102 in 402. Buyer 106 may provide billing information, provide a drop-off time and location (or provide this information during a later step), and supply other requisite information. In one embodiment, buyer 106 may specify preferred carrier. Buyer 106 may choose a Local Shipping option. Online market 110 may perform additional verifications if buyer 106 chooses the Local Shipping option if seller 102 and buyer 106, for example, verifying that seller 102 and buyer 106 reside in a proximate geographic location and/or that a regionally affiliated carrier exists to provide the localized shipping.

In 406, online market 110 may estimate a dimensional weight for an item. Generally speaking, online market 110 may employ predictive functions 122 to derive an estimated shipping cost for the item based on actual shipping costs and stored characteristics in past listings 112. Deep learning model 120 may derive a vector based on characteristics representing the item. Predictive functions 122 may then calculate a K-number of proximate vectors from among the stored information. From the K-number of proximate vectors, predictive functions 122 may calculate a weighted average representing the estimated dimensional weight of item 104. In the red, 32-GB IPHONE 7 example, the weighted average may include the actual dimensional weights associated with previous sales of phones. Depending on the number K and the history of the data, this may also include sales of other phones but may not include sales of purses. One skilled in the relevant art(s) will understand that discrepancies in shipping weights may exist even among very similar items, e.g., if a user includes a power cord in one shipment of an IPHONE but not in a second shipment of an IPHONE. This process of estimating the dimensional weight employed in 406 is described in more particular detail below with reference to FIG. 5.

In 408, online market 110 may access API 109 provided by carrier 108 to receive a quote for the delivery. Online market 110 may formulate an appropriate web request containing suitable parameters, e.g., an appropriate query that includes the dimensional weight, the origin, and the destination for the shipment. If buyer 106 and seller 102 selected Local Shipping, then online market 110 may choose an appropriate local courier to ship the item, e.g., POSTMATES, AMAZON, etc. In other embodiments, online market 110 may access a national carrier or access multiple carriers to determine the lowest price for an object with the estimated dimensional weight. The web request provided to API 109 may include the dimensional weight estimated for item 104 in 406.

In 410, online market 110 may receive a response from carrier 108/API 109 indicating the estimated cost of shipping. The estimated cost of shipping may be a dollar amount representing the cost of shipping an object with the estimated dimensional weight. The estimated cost of shipping may further include distance-based, time-based, or other pricing adjustments. In another embodiment, online market 110 may bypass the interaction with systems of carrier 108, i.e., perform steps 408 and 410 internally to determine the estimated cost with reference to internally accessible carrier price charts.

In 412, online market 110 may provide the quote received/generated in 408 to buyer 106. Buyer 106 is thus made aware of the estimated shipping costs prior to completing the transaction.

In 414, buyer 106 may confirm the transaction with the estimating shipping costs being confirmed as well. Buyer 106 may also specify a drop-off location and drop-off time.

In 416, online market 110 may provide the quote to seller 102 to complete the process. If carrier 108 is a national carrier, in some embodiments and for some carriers, this step may be skipped, as the shipping costs may be a flat fee. However, especially in the context of the Local Shipping feature and embodiments in which seller 102 covers the cost of shipping, seller 102 may confirm the estimated shipping costs prior to completing the transaction.

In 418, seller 102 may confirm/accept the shipping details and quoted price. Seller 102 may also provide a pickup location and pickup time to coordinate with the national carrier or local carrier.

In 420, online market 110 may create a transaction at carrier 108 to engage carrier 108 to complete the delivery or otherwise schedule the delivery with carrier 108 by placing a shipping order. In one embodiment, online market 110 may access API 109 to schedule delivery. Online market 110 may formulate an appropriate web request that contains information specified by seller 102 and buyer 106. Such information may include the item shipped, the dimensional weight of the item, the pickup time and location, the drop-off time and location, payment information and authorizations, and other suitable information. Online market 110 may receive confirmation of the scheduled shipment from API 109 and provide this information to buyer 106 and seller 102. Online market 110 may provide additional capabilities to track progress of the shipment, cancel the shipment, etc.

Figure 5:
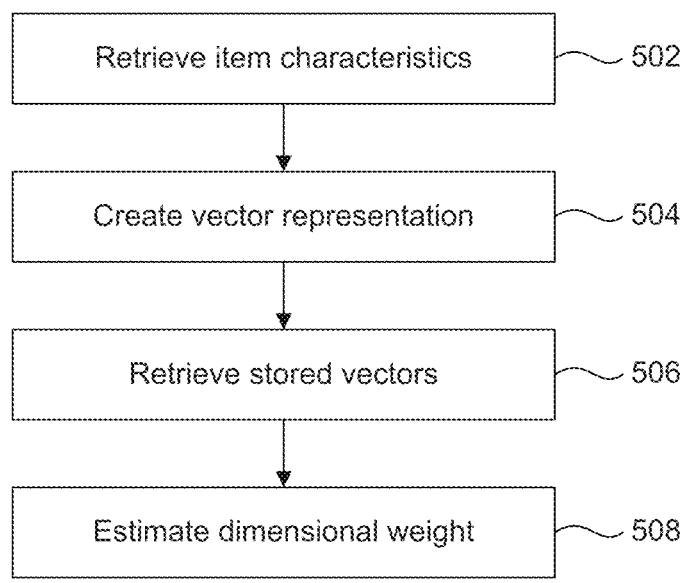
FIG. 5 is a flowchart illustrating a method of estimating a dimensional weight to calculate the cost of shipping an item from a buyer to a seller through an online market, according to some embodiments.

FIG. 5 is a flowchart illustrating a method 500 of estimating a dimensional weight in the course of estimating the cost of shipping an item from a buyer to a seller when finalizing a transaction in an online market, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, online market 110 may retrieve, determine, or ascertain characteristics associated with an item being purchased by buyer 106 from seller 102 on online market 110. The determined characteristics may be a variety of qualities associated with the item as entered by seller 102 or determined programmatically within online market 110. Online market 110 may retrieve information about the item from the listing and/or information stored about products in online market 110. In the red, 32-GB IPHONE 7, the retrieved characteristics may include "red", "32-GB", and "IPHONE 7." However the characteristics may also be based on information included in the listing, e.g., the price, the year purchased, the condition, whether a case is included, any accessories, etc. The characteristics may also include ascertained characteristics known to online market 110, e.g., the notion that the item is a "phone", "electronic good", or other known information.

In 504, online market 110 may engage deep learning model 120 to create a vector representation of the characteristics retrieved in 502. In one embodiment, the vector may be a 128-bit vector of floating point decimal numbers or other suitable mathematic representation of the characteristics. This represents the characteristics retrieved in 502 in space, facilitating the Euclidian distance calculations described in subsequent steps. For simplicity, the vector created in 504 representing the item currently being estimated may be referred to below as the "current vector."

In 506, online market 110 may retrieve stored vectors representing characteristics 114 in past listings 112. Such vectors may represent items that were previously sold on online market 110. Each vector may be associated with a stored ground truth in shipping information 116, i.e., the actual shipping costs and/or dimensional weight determined for the item. In one embodiment, the stored vectors may be retrieved, however, in another embodiment the characteristics may be retrieved and the associated vectors recalculated as part of the retrieval.

In step 508, predictive functions 122 may employ a function, f(x)->y, that determines the dimensional weight for the item being shipped by comparing the current vector to the stored vectors retrieved in 508. In this equation, "y" is the target variable, and represents the estimated dimensional weight for the item being shipped. In this equation, "x" represents the characteristics associated with the target vector, such as image, title, categorical information, brand, price, color, etc.

Numerous such functions, f( ), may exist in accordance with this disclosure and one such illustrative approach to the function in f(x)->y is detailed next. Predictive functions 122 may first determine the K-nearest vectors among the retrieved vectors to the current vector. One skilled in the art(s) will appreciate that the retrieved vectors may be represented in geometric space, for example in a 128-dimension space (reduced to a two-dimensional space as shown in FIG. 3 for the purposes of an intelligible figure.) In such a 128-dimension space, a Euclidian distance may be calculated between the current vector and the stored vectors. Thus, predictive functions 122 may determine the K-nearest neighbors, where K is a value that is configurable, dynamic, or static within online market 110. For example, K may vary depending on the amount of data stored in past listings 112.

Each of the K-nearest neighbors may have a ground truth stored in shipping information 116. This ground truth is the actual dimensional weight of the item when shipped in the real-world. Predictive functions 122 may then calculate an average weight based on the actual dimensional weights associated with the K-closest neighbors. Predictive functions 122 may impose a bias in the weighted average through the use of an appropriate cost function that skews the estimates to error towards making heavier estimates. Because the predictive functions 122 may make errors, an online market benefits from having these errors skew towards more expensive estimates, so that the costs are passed on to the users instead of absorbed by the online market. Several methodologies exist for imposing such a cost function. For example, a loss function may be implemented that provides a weight for each class of dimensional weights adjusting the dimensional weights up for heavier weights and down for lighter weights when totaling across all K-closest neighbors. For another example, all the dimensional weights may be divided by the maximum dimensional weight among the K-closest neighbors when calculating the average, allowing the heavier dimensional weights to have a heavier sway on the calculated weighted average.

As discussed above with reference to FIG. 4, the dimensional weight estimated by predictive functions 122 may subsequently be used by online market 110 to determine an estimated cost. In one embodiment, this estimated cost may be determine programmatically for a selected carrier by passing the estimated dimensional weight to API 109 and receiving the estimated cost in return. In another embodiment, predictive functions 122 may bypass interaction with carrier 108 and determine the estimated cost with reference to internally stored price charts about carriers or employ an internal/external service to estimate the cost based on the estimated dimensional weight.

Figure 6:
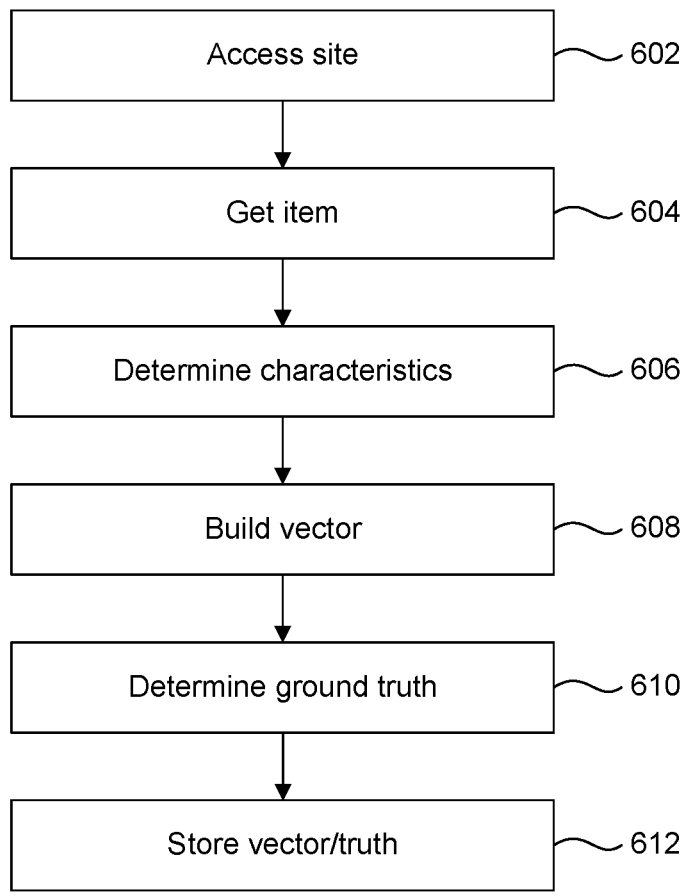
FIG. 6 is a flowchart illustrating a method of augmenting the stored vector representations of past sales using a harvesting script, according to some embodiments.

FIG. 6 is a flowchart illustrating a method 600 of augmenting the stored vector representations of past sales using a harvesting script, according to some embodiments, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art(s).

In 602, online market 110 may employ harvesting script 124 to access an external website or other source of information for the purposes of extracting information from the website to build onto past listings 112. For example, the external website may be another online market on which other products are sold. However, the external site may also be other suitable websites or information sources having information about products. Harvesting script 124 employ a spider, crawler, etc. to access the external site via HTTP or other suitable protocol.

In 604, harvesting script 124 may determine an item to examine on the external site. In an embodiment, harvesting script 124 may target a particular item for research based on an identified deficiency in the data stored in past listings 112. In another embodiment, harvesting script 124 may operate iteratively, recursively, randomly, etc. The particular item identified on the external site will be referred to in the disclosure below as the scraped item.

In 606, harvesting script 124 may determine characteristics associated with the scraped item. The characteristics may be provided in metadata associated with the scraped item, associated detail web pages, or in other locations in the accessed website. These characteristics may be further augmented by accessing internally stored glossaries or other stored information about products.

In 608, harvesting script 124 may leverage deep learning model 120 to build a vector representation of the characteristics associated with the scraped item. This vector representation may be built in similar fashion to the vectors described above with reference to the cost-estimation functionality provided by deep learning model 120 and predictive functions 122. For example, the vector representation may be a 128-bit vector of floating point decimal numbers or other suitable mathematic representation of the characteristics ascertained in 606. The vector representation thus represents the scraped item in dimensional space.

In 610, harvesting script 124 may determine the ground truth, e.g., an actual shipping cost associated with the scraped item. In some embodiments, this ground truth may be determined within the accessed website. For other embodiments, the ground truth may be garnered with access to other websites or sources. In another embodiments, the ground truth may be ascertained with reference to information stored in the systems of online market 110.

In 612, harvesting script 124 may store the vector representation of the scraped item and ascertained ground truth in past listings 112. By harvesting data from external sites in this fashion, online market 110 may fill gaps among previously sold items, for example, in the white spaces apparent in FIG. 3. This harvesting allows predictive functions 122 to accurately estimate the dimensional weight for a wider range of objects. Such harvesting may thus provide increased accuracy and subsequent cost savings, especially when estimating dimensional weights for heavier, more expensive, and/or more obscure items.

Figure 7:
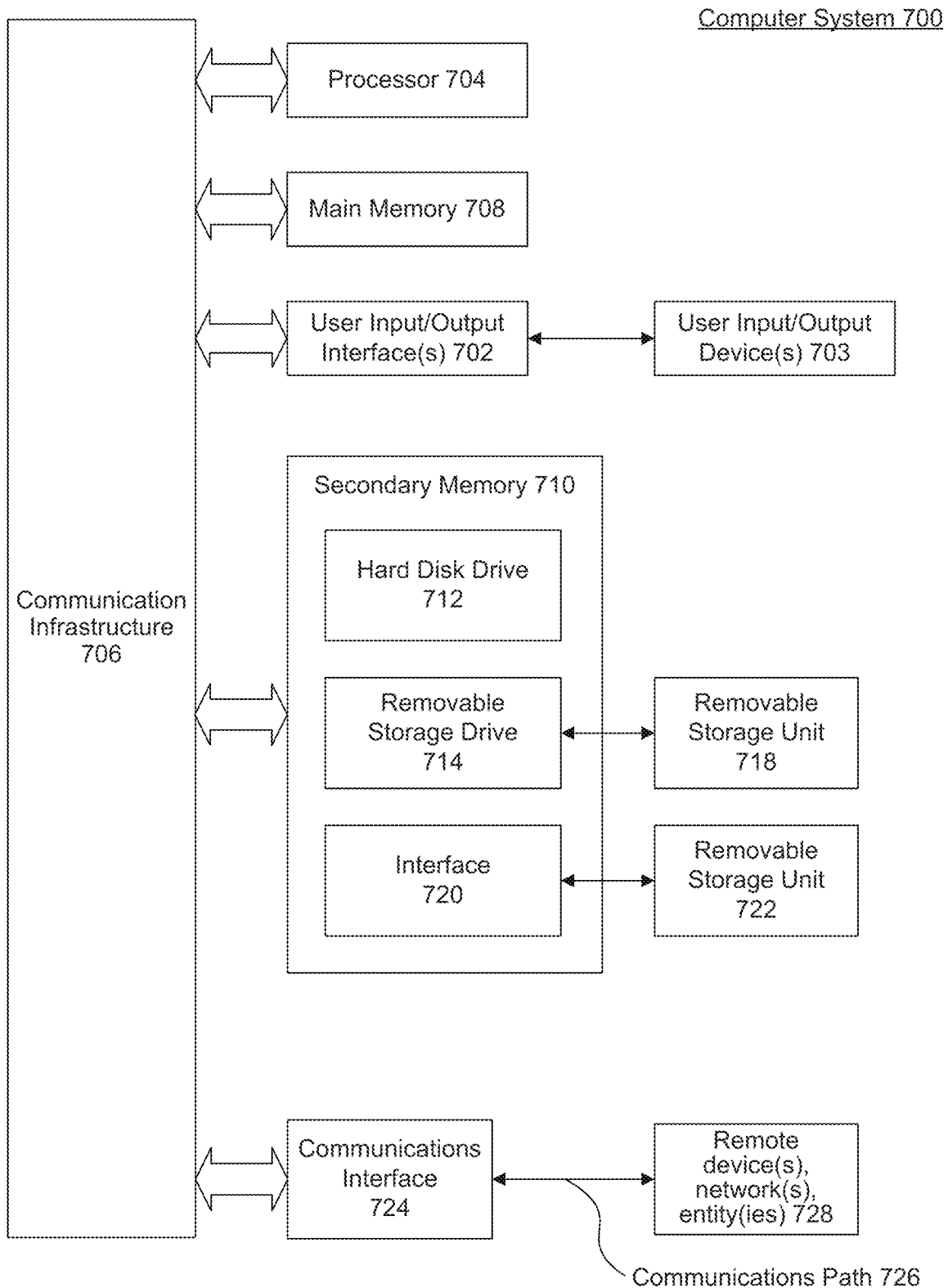
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 708, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:

estimating, by one or more processors, a dimensional weight for an item purchased by a first user in an online market, wherein the item is shipped to a destination associated with the first user from an origin associated with a second user using a carrier, wherein the item is associated with a plurality of characteristics, and wherein the dimensional weight is determined by referencing a plurality of learned vectors each representing a previously shipped item;

creating, by the one or more processors, a vector that represents the item based on the plurality of characteristics;

determining, by the one or more processors, one or more nearest vectors among the plurality of learned vectors by calculating distances between the vector that represents the item and the plurality of learned vectors to determine the one or more nearest vectors, wherein each vector in the one or more nearest vectors comprises an actual dimensional weight;

determining, by the one or more processors, the dimensional weight of the item purchased by the first user, by calculating a weighted average of the actual dimensional weight for each vector in the one or more nearest vectors, wherein the actual dimensional weight for a first set of the one or more nearest vectors is adjusted up for heavier weights;

determining, by the one or more processors, an estimated cost based on the dimensional weight of the item and the carrier; and scheduling, by the one or more processors, a delivery of the item with the carrier for the estimated cost.

2. The method of claim 1, wherein the creating is performed using a deep learning model comprising an item similarity model.

3. The method of claim 1, wherein the calculating the weighted average employs a cost function that biases the weighted average towards a heavier estimate.

4. The method of claim 1, wherein the carrier is a local carrier.

5. The method of claim 1, the determining the estimated cost further comprising:

sending, by the one or more processors, a query comprising the dimensional weight, the origin, and the destination to an application programming interface offered by the carrier and receiving the estimated cost in response.

6. The method of claim 1, the scheduling the delivery further comprising:

sending, by the one or more processors, the estimated cost to the second user;

receiving, by the one or more processors, a confirmation of the estimated cost, the origin and a pickup time from the second user;

receiving, by the one or more processors, a confirmation of the destination and a drop-off time from the first user;

accessing, by the one or more processors, an application programming interface offered by the carrier to place a shipping order comprising the item, the dimensional weight, the origin, the pickup time, the destination, and the drop-off time.

7. The method of claim 1, further comprising:
building, by the one or more processors, a plurality of external characteristics associated with an external item by harvesting information about the external item from a website;
creating, by the one or more processors, an external vector that represents the external item based on the plurality of external characteristics using a deep learning model;
adding, by the one or more processors, the external vector to the plurality of learned vectors.

8. A system, comprising:
a memory, and
at least one processor coupled to the memory and configured to:
estimate a dimensional weight for an item purchased by a first user in an online market, wherein the item is shipped to a destination associated with the first user from an origin associated with a second user using a carrier, wherein the item is associated with a plurality of characteristics, and wherein the dimensional weight is determined by referencing a plurality of learned vectors each representing a previously shipped item;
create a vector that represents the item based on the plurality of characteristics;
determine one or more nearest vectors among the plurality of learned vectors by calculating distances between the vector that represents the item and the plurality of learned vectors to determine the one or more nearest vectors, wherein each vector in the one or more nearest vectors comprises an actual dimensional weight;
determine the dimensional weight of the item purchased by the first user, by calculating a weighted average of the actual dimensional weight for each vector in the one or more nearest vectors, wherein the actual dimensional weight for a first set of the one or more nearest vectors is adjusted up for heavier weights;
determine an estimated cost based on the dimensional weight of the item and the carrier; and
schedule a delivery of the item with the carrier for the estimated cost.

9. The system of claim 8, wherein the calculating the weighted average employs a cost function that biases the weighted average towards a heavier estimate.

10. The system of claim 8, wherein the carrier is a local carrier.

11. The system of claim 8, wherein to determine the estimated cost, the at least one processor is further configured to:
send a query comprising the dimensional weight, the origin, and the destination to an application programming interface offered by the carrier and receive the estimated cost in response.

12. The system of claim 8, wherein to schedule the delivery, the at least one processor is further configured to:
send the estimated cost to the second user;
receive a confirmation of the estimated cost, the origin, and a pickup time from the second user;
receive a confirmation of the destination and a drop-off time from the first user;
access an application programming interface offered by the carrier to place a shipping order comprising the item, the dimensional weight, the origin, the pickup time, the destination, and the drop-off time.

13. A non-transitory computer-readable device having instructions stored thereon that, when executed by at least one computing device, cause the at least one computing device to perform operations comprising:
estimating a dimensional weight for an item purchased by a first user in an online market, wherein the item is shipped to a destination associated with the first user from an origin associated with a second user using a carrier, wherein the item is associated with a plurality of characteristics, and wherein the dimensional weight is determined by referencing a plurality of learned vectors each representing a previously shipped item;
creating a vector that represents the item based on the plurality of characteristics;
determining one or more nearest vectors among the plurality of learned vectors by calculating distances between the vector that represents the item and the plurality of learned vectors to determine the one or more nearest vectors, wherein each vector in the one or more nearest vectors comprises an actual dimensional weight;
determining the dimensional weight of the item purchased by the first user, by calculating a weighted average of the actual dimensional weight for each vector in the one or more nearest vectors, wherein the actual dimensional weight for a first set of the one or more nearest vectors is adjusted up for heavier weights;
determining an estimated cost based on the dimensional weight of the item and the carrier; and
scheduling a delivery of the item with the carrier for the estimated cost.

14. The non-transitory computer-readable device of claim 13, wherein the carrier is a local carrier.

15. The non-transitory computer-readable device of claim 13, wherein the calculating the weighted average employs a cost function that biases the weighted average towards a heavier estimate.

16. The non-transitory computer-readable device of claim 13, the determining the estimated cost comprising:
sending a query comprising the dimensional weight, the origin, and the destination to an application programming interface offered by the carrier and receiving the estimated cost in response.

17. The non-transitory computer-readable device of claim 13, the scheduling the delivery comprising:
sending the estimated cost to the second user;
receiving a confirmation of the estimated cost, the origin, and a pickup time from the second user;
receiving a confirmation of the destination and a drop-off time from the first user;
accessing an application programming interface offered by the carrier to place a shipping order comprising the item, the dimensional weight, the origin, the pickup time, the destination, and the drop-off time.

18. The method of claim 1, wherein the actual dimensional weight for a second set of the one or more nearest vectors is adjusted down for lighter weights.

19. The method of claim 1, wherein the calculating distances comprises calculating a Euclidian distance between the vector that represents the item and the plurality of learned vectors.

* * * * *